United States Patent [19]

Kropp

[11] Patent Number: 5,131,259
[45] Date of Patent: Jul. 21, 1992

[54] CALIBRATION FIXTURE AND METHOD OF CALIBRATING CONTACT SENSORS

[75] Inventor: Harry C. Kropp, Chicago, Ill.

[73] Assignee: Fel-Pro Incorporated, Skokie, Ill.

[21] Appl. No.: 649,457

[22] Filed: Feb. 1, 1991

[51] Int. Cl.$^5$ .............................................. G01L 25/00
[52] U.S. Cl. ..................................................... 73/1 B
[58] Field of Search ................. 73/1 B, 1 C, 4 R, 4 D, 73/4 V, 723, 725, 726

[56] References Cited

U.S. PATENT DOCUMENTS

| | | | |
|---|---|---|---|
| 2,920,299 | 1/1960 | Lent | 73/726 |
| 4,500,864 | 2/1985 | Nakane et al. | 73/726 |
| 4,734,034 | 3/1988 | Maness et al. | 433/68 |
| 4,735,092 | 4/1988 | Kenny | 73/840 |
| 4,809,536 | 3/1989 | Nishiguchi | 73/4 R |
| 4,825,684 | 5/1989 | Nishiguchi et al. | 73/4 R |
| 4,856,993 | 8/1989 | Maness et al. | 433/68 |
| 5,031,462 | 7/1991 | Lam | 73/726 |

OTHER PUBLICATIONS

"Touch the Future through Force Sensing Resistors" from Interlink Electronics (6 page undated literature).
"Force and Position Sensing Resistors an Emerging Technology" from Interlink Electronics (4 page undated article).

Primary Examiner—Hezron E. Williams
Assistant Examiner—Howard Wisnia
Attorney, Agent, or Firm—Dressler, Goldsmith, Shore, Sutker & Milnamow, Ltd.

[57] ABSTRACT

A calibration fixture for a contact sensor for applying a uniform pressure to each contact sensor intersection and a method of using the fixture. The fixture includes a first plate above which a contact sensor is supported, a second plate confronting the first plate and spaced therefrom, an annular sealing member supported on the second plate, a bladder disposed between the sealing member and the second plate to define a fluid pressure chamber circumscribed by the sealing member, a frame for holding the first and second plates in their confronting relationship, and a pressurized fluid entry passage extending through the second plate and communicating with the pressure chamber. The fixture is used by positioning a contact sensor between the first plate and the bladder, then pressurizing the fluid pressure chamber by introducing pressurized fluid thereinto to force the bladder into intimate contact with the contact sensor, uniformly to apply force against each electrode intersection circumscribed by the sealing member, and then sensing the outputs for each electrode intersection.

15 Claims, 3 Drawing Sheets

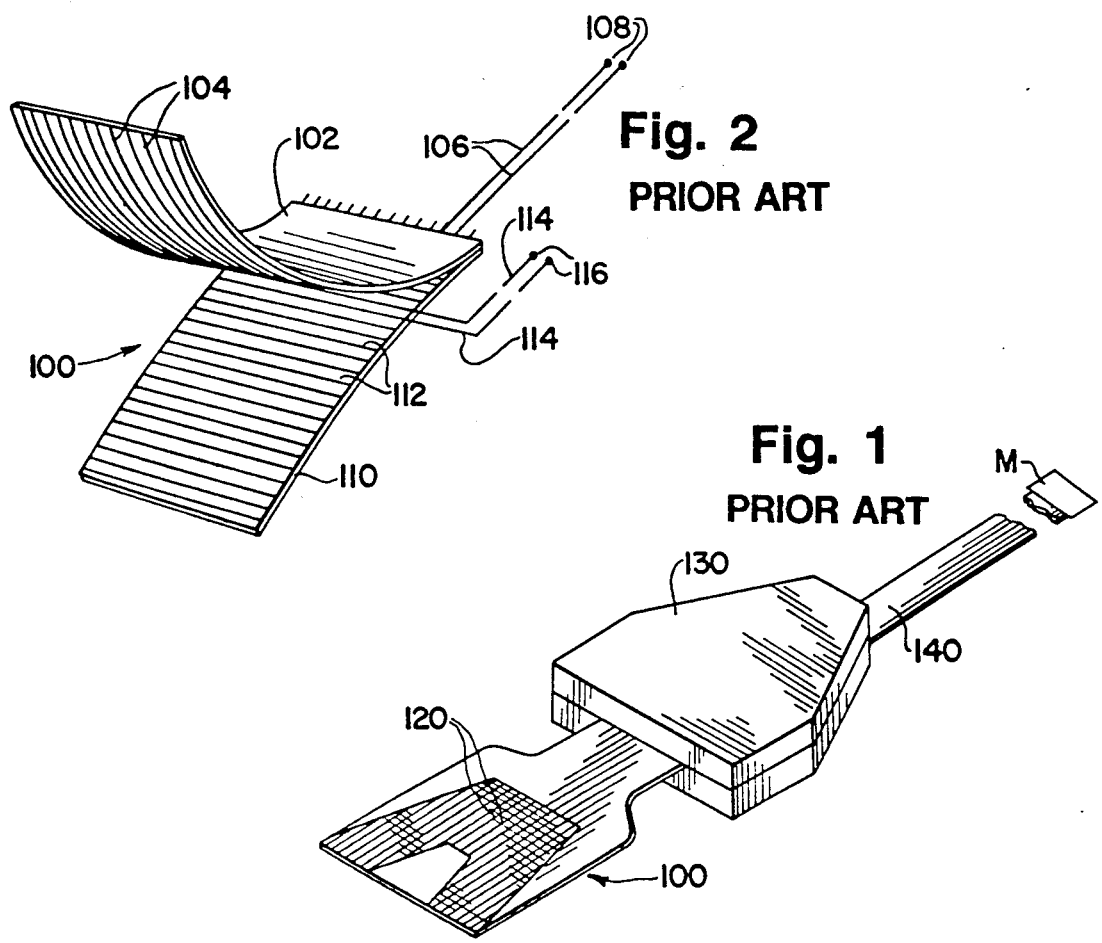
Fig. 2 PRIOR ART
Fig. 1 PRIOR ART
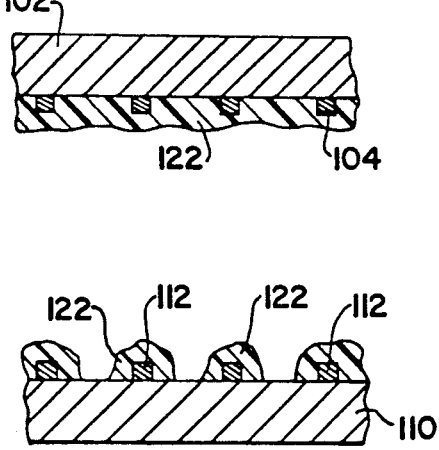
Fig. 3 PRIOR ART
Fig. 4 PRIOR ART
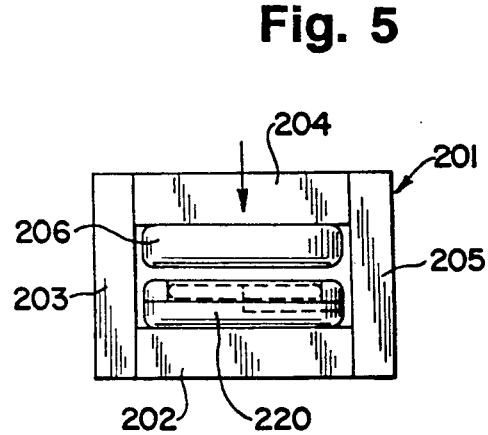
Fig. 5

CALIBRATION FIXTURE AND METHOD OF CALIBRATING CONTACT SENSORS

BACKGROUND OF THE INVENTION

Contact sensors for sensing and measuring opposing forces at a plurality of locations, and systems for using them are disclosed in U.S. Pat. Nos. 4,734,034 and 4,856,993. Such sensors broadly comprise a pair of backing sheets, each with a set of parallel electrodes, with the sets of parallel electrodes in a facing, crossing pattern, thereby providing a plurality of closely adjacent intersections. A resistive, semiconductive material is disposed between the facing electrodes at each intersection. As such a variable output from the sensor depending upon the relative force applied may be obtained at each intersection. Typical materials used to form such sensors, their dimensions, the associated reader heads, etc., are all described in the above patents, the disclosures of which are here incorporated by reference.

Although careful efforts may be employed to make each contact sensor exactly uniform across its operating sensing zone, namely at each relevant intersection of the crossing electrodes, it will be apparent that slight differences in thicknesses of the materials across their widths and along their lengths, as well as discontinuities and differences in the thicknesses and characteristics of the deposits of the resistive material at the intersections of the sets of electrodes will produce pluralities of intersections which are somewhat non-uniform in their outputs for a given applied force. Furthermore, such non-uniformities may well vary with the applied force.

Where contact sensors of these types are to be used to measure applied forces closely or accurately, as distinguished, for example, from sensing contact versus non-contact, it becomes desirable and necessary to calibrate each contact sensor so that its varying characteristics at the plural intersections may be determined. Thereafter, when a contact sensor is used to provide accurate representations of differing loads applied at the intersections, the differences attributable to the differences in the intersections themselves may be taken into consideration and eliminated as variables. As such, a calibration fixture and method for facilitating accurate calibration would be desirable.

SUMMARY OF THE INVENTION

In accordance with this invention, a calibration fixture and method for calibrating contact sensors are provided. A contact sensor for which the calibration fixture and method is designed includes a first backing sheet having a first plurality of electrodes, a second backing sheet having a second plurality of electrodes confronting said first plurality in a crossing pattern to define a plurality of intersections, and resistive material between the electrodes at each intersection to electrically isolate the confronting electrodes at each intersection, and for providing a variable output representative of the applied force at each intersection as force is applied thereto. Conductors for each of the electrodes terminating in remote contacts from which readings may be taken are provided. The calibration fixture comprises a first plate against which a contact sensor is supported, a second plate confronting said first plate and spaced therefrom, and a frame assembly for holding the first and second plates in their confronting relationship.

An annular sealing member is supported on the second plate which also defines a pressurized fluid entry passage extending therethrough. When a contact sensor is disposed between the annular sealing member and the first plate and the zone between the second plate and the annular sealing member is pressurized by fluid passing through the fluid entry passage, a uniform force is applied to the contact sensor at each electrode intersection circumscribed by the annular sealing member.

Preferably the first plate defines a vent means in the surface confronting the annular sealing member and the annular sealing member is an O-ring. Additionally the calibration fixture further desirably includes means outside the annular sealing member for sensing the outputs for each electrode intersection and means for storing representations of the outputs for each electrode intersection.

Most preferably the calibration fixture includes a bladder disposed between the sealing member and the second plate to define the fluid pressure chamber, the bladder directly contacts the first plate and all of the electrode intersections in the contact sensor are circumscribed by the sealing member. In this form it is preferred that the annular sealing member be supported in a side surface of the second plate at a location spaced from the contact sensor.

The method of the present invention preferably comprises the steps of positioning a contact sensor of the type described between the first plate and the bladder of the calibration fixture described above, pressurizing the fluid pressure chamber by introducing pressurized fluid into the fluid pressure chamber to force the bladder into intimate contact with the contact sensor uniformly to apply force against each electrode intersection circumscribed by the sealing member, and sensing and storing outputs representative of each electrode intersection. In the preferred form the sensing and storing steps are repeated at at least two additional pressures to develop data for representative curves for each electrode intersection. The preferred fluid is liquid, although the method may be practiced at lower pressures with a compressed gas.

Further objects, features and advantages of the present invention will become apparent from the following description and appended drawings.

BRIEF DESCRIPTION OF THE DRAWINGS

FIG. 1 illustrates a prior art contact sensor and a device for reading outputs therefrom;

FIG. 2 is a schematic view of a portion of a prior art contact sensor of FIG. 1;

FIGS. 3 and 4 are fragmentary cross-sectional views of the prior art contact sensor of FIG. 1;

FIG. 5 is a side elevational view of a calibration fixture of the present invention;

DESCRIPTION OF PRESENTLY PREFERRED EMBODIMENTS OF THE INVENTION

Figure 6:
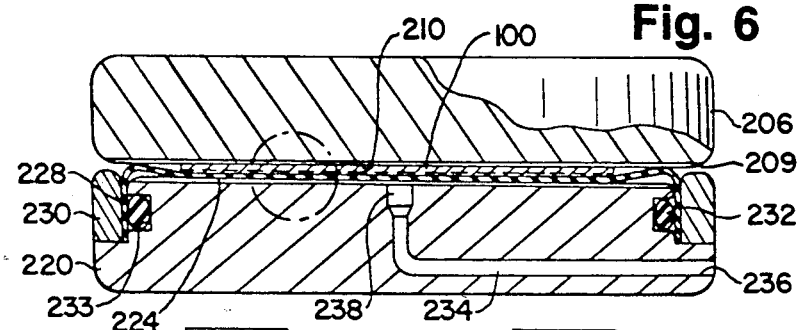
FIG. 6 is an enlarged view of the calibration fixture of FIG. 5 in an operative condition.
Figure 8:
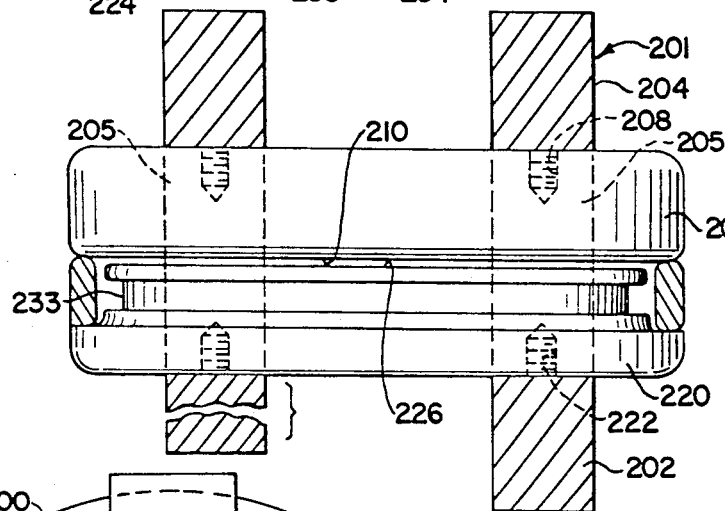
FIG. 8 is a fragmentary end elevational view similar to FIG. 6.

A typical contact sensor 100 made in accordance with the prior art as typically described in U.S. Pat. No. 4,856,993 and which may be calibrated in accordance with this invention is schematically illustrated in FIGS. 1-4. Thus, sensor 100 includes a first thin flexible backing sheet 102 on which a first plurality of parallel electrodes 104 are deposited and a second thin flexible backing sheet 110 on which a plurality of electrodes 112 are deposited in a pattern to cross electrodes 104, thereby to provide a large plurality of intersections 120. The backing sheets may be of a polyester film such as Mylar.

As seen in FIGS. 3 and 4 the electrodes 104 are coated with a resistive material 122 whereas the electrodes 112 may be coated with stripes of a resistive material 122. Preferably the resistive material may be an carbon-molybdenum disulfide material in an acrylic binder, which material has variable force versus resistive characteristics obtainable with contact sensors of this type. Except under pressure, the crossing electrodes are electrically isolated at the intersections by the resistive material.

Each electrode 104, 112 is connected to a lead or conductor 106, 114, respectively, which terminates in a contact 108, 116, respectively. The contacts 108, 116 are positionable in a reader or connector 130 which in turn is connected to a multi-conductor cable 140 for the measurement electronics, microprocessor M, all as disclosed in U.S. Pat. No. 4,856,993.

As stated, the contact sensor 100 described may be made and used in the manner described in U.S. Pat. No. 4,856,993. The changes in resistances at the electrode intersections may be ascertained in the manner there described and output representative of the opposing forces applied at the intersections may then be determined in the manner described in U.S. Pat. No. 4,856,993.

Because of imperfections in the techniques of depositing the resistive coatings, both as to thickness of the deposit and its non-uniformity due to variations in material itself and discontinuities, as well as because of other non-uniformities in the contact sensor and the components of which they are made, contact sensors 100 are not uniform across all of the intersections and the same applied forces frequently produce different outputs. As such, particularly when representations of absolute outputs or of a large plurality of ranges of outputs are desired and the intention is to compare such representations for a plurality of intersections, it is necessary to calibrate each contact sensor to provide reference data for each intersection of the particular sensor. Although such is desirable, again because of variations in thicknesses of the contact sensor at the intersections, it is not possible, for example, to use forces applied through a pair of spaced flat plates to impose known identical forces at the plurality of intersections.

FIGS. 5 to 9 illustrate an improved calibration fixture 200 in accordance with this invention. It is seen to include a rigid load frame 201 having members 202, 203, 204 and 205 which maintain plates 206 and 220 in a predetermined spaced relationship.

Frame member 204 secures a first plate 206 against which a contact sensor 100 is adapted to be positioned. Plate 206 may be secured to frame member 204 by threaded fasteners (not shown) which are received in tapped holes 208 in plate 206. The surface 210 of plate 206 is planar and flat and is preferably slightly roughened, as by surface grinding to a finish sufficient to serve as a vent means. Alternatively roughening by scoring, as with a score line having a width of up to 2 mils and a depth of up to 0.1 mil may also be used to serve as a vent means. These dimensions are much less than the widths of the electrodes and therefore will not affect the function of plate 206 because the contact sensor, for all practical purposes will "see" only an essentially flat surface. However the scoring 209 schematically illustrated in grossly enlarged fashion in FIG. 6 will permit air to escape during calibration, as will be described, to prevent interference with the calibration process.

Frame member 202 secures and holds a second plate 220 thereto. Plate 220 may be secured to frame member 202 as by threaded fasteners (not shown) which are received in tapped holes 222 in plate 220. As may be seen, plate 220 is spaced from and positioned to closely confront, plate 206 and its contact surface 210. They are spaced sufficiently apart so that a contact sensor may be slid between them for calibration purposes.

Plate 220 is adapted to mount a bladder 224 through which uniform pressure may be applied against the contact sensor (which has been slid into position thereover) throughout the zone of the intersections 120. To that end when the calibration fixture is not in use, bladder 224 lies against the upper surface 226 of plate 220, namely the surface which confronts the force applying surface 210 of plate 204. The peripheral or marginal edge 228 of bladder 224 is sealingly clamped between a solid metallic retaining ring 230 and an annular sealing member, such as an O-ring 232 disposed in an appropriately configured annular groove 233 in a side surface of plate 220. Bladder 224 may be a very thin, gas and liquid impermeable layer of polyester film or may be a rubber or rubber-like material.

Figure 7:
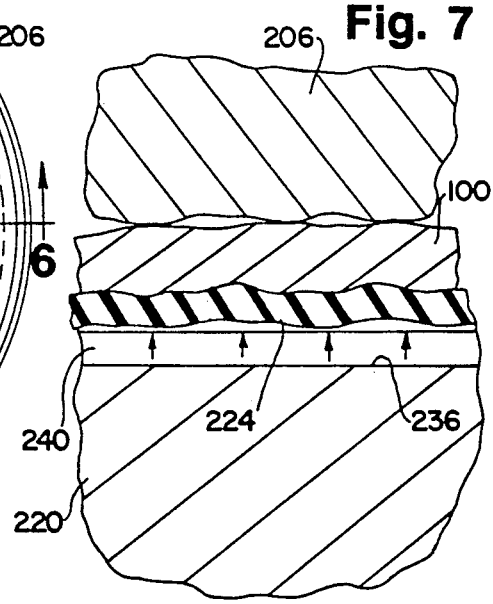
FIG. 7 is a greatly enlarged view of a position of FIG. 6 as signified by the circle in FIG. 6 showing the enlarged zone.
Figure 9:
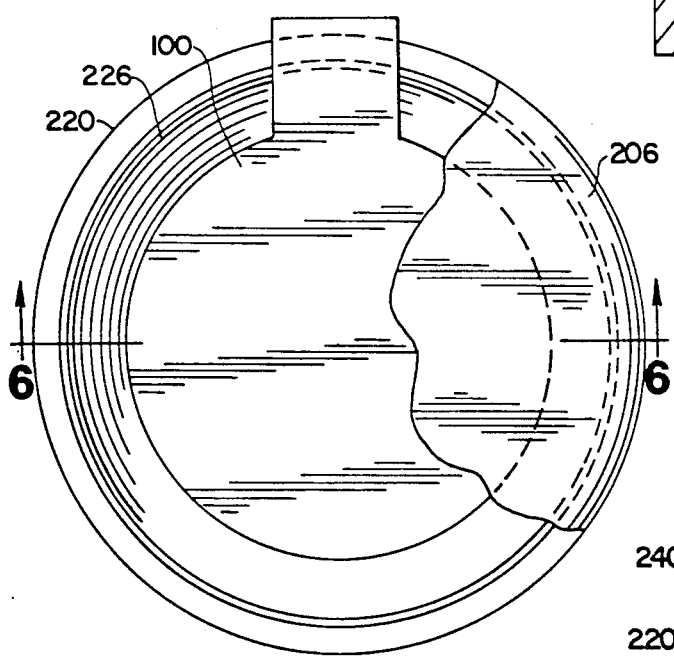
FIG. 9 is a fragmentary view of FIG. 6, showing a typical positioning of a contact sensor.

As best seen in FIG. 7, plate 220 defines a pressurized fluid entry passage 234 extending therethrough from an entry port 236 to a discharge port 238 which in turn communicates with a pressure chamber 240. Preferably, in this embodiment, the fluid used is a suitable, conventional hydraulic fluid. Thus, as hydraulic fluid is supplied to entry port 236 to enter the pressure chamber 240 beneath bladder 224, the integrity of the chamber 240 is maintained by O-ring 232. As such the fluid forces the bladder against the O-ring 232 to deform the O-ring, thereby providing a seal so that fluid does not escape.

As pressure chamber 240 is pressurized, a uniform, identical load or force is applied against every electrode intersection 120 of contact sensor 100 which is within the zone circumscribed by the O-ring.

As shown, the sealing ring 230 is so positioned that the entire sensing zone of the contact sensor is circumscribed by the bladder 224 which is self-energizing cicumferentially, i.e., directly contacts and seals against the surface 210 of plate 206 via a circumferential sealing zone 211 of the bladder. The leads from the electrodes pass above the bladder to the connector 130. It will be appreciated that the roughening or scoring of the surface 210 will serve to vent any gases above the bladder 224 in the area of the contact sensor 100, thereby to prevent anomalies resulting from pockets of trapped atmospheric air.

Figure 10:
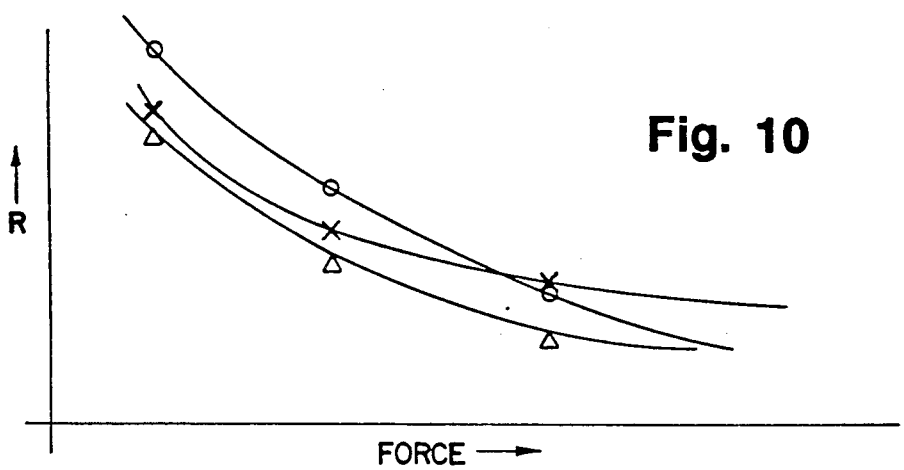
FIG. 10 is a schematic representation of curves developed at three hypothetical intersections during calibration of a contact sensor.

During pressurization of the chamber 240 at a given pressure, outputs are sensed, read and then processed for each relevant intersection. The outputs are then analyzed in the manner described in U.S. Pat. No. 4,856,993, to produce readings or values. This step is preferably repeated at several different pressures, preferably at least three different pressures, to provide data representing a curve for each intersection. Three schematic curves for three different hypothetical intersections are illustrated by FIG. 10. The curves may be depicted graphically as shown, or data may be stored in a microprocessor or computer as representative of the characteristics of each intersection, as in the manner suggested in U.S. Pat. No. 4,856,993.

Later, when the calibrated contact sensor is to be used, accurate comparative representatives of the force applied at the several intersections may be obtained by utilizing the stored data and applying it to the newly sensed outputs in an appropriate and apparent manner.

In the embodiment of FIG. 5 to 9 hydraulic fluid was used to apply force to the contact sensor above the bladder. Hydraulic fluid is preferred, especially at pressures of 1000 psi and above, for safety reasons. Also, at higher pressures maintaining a seal in the pressure chamber is more easily accomplished with a liquid than with a gas, although pressurized gases such as nitrogen may be used as well, particularly at pressures of 3000 psi and less.

Figure 11:
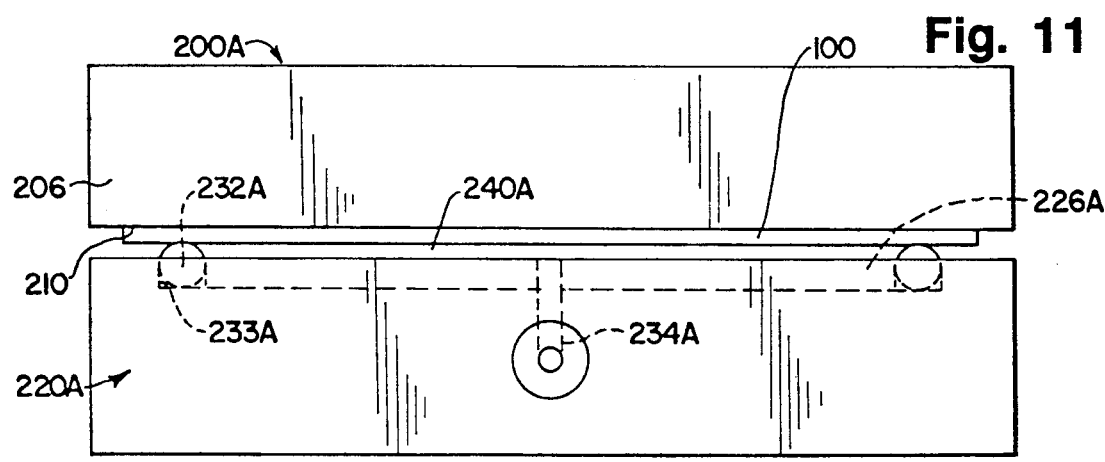
FIG. 11 is a fragmentary side elevational view of an alternative calibration fixture.
Figure 12:
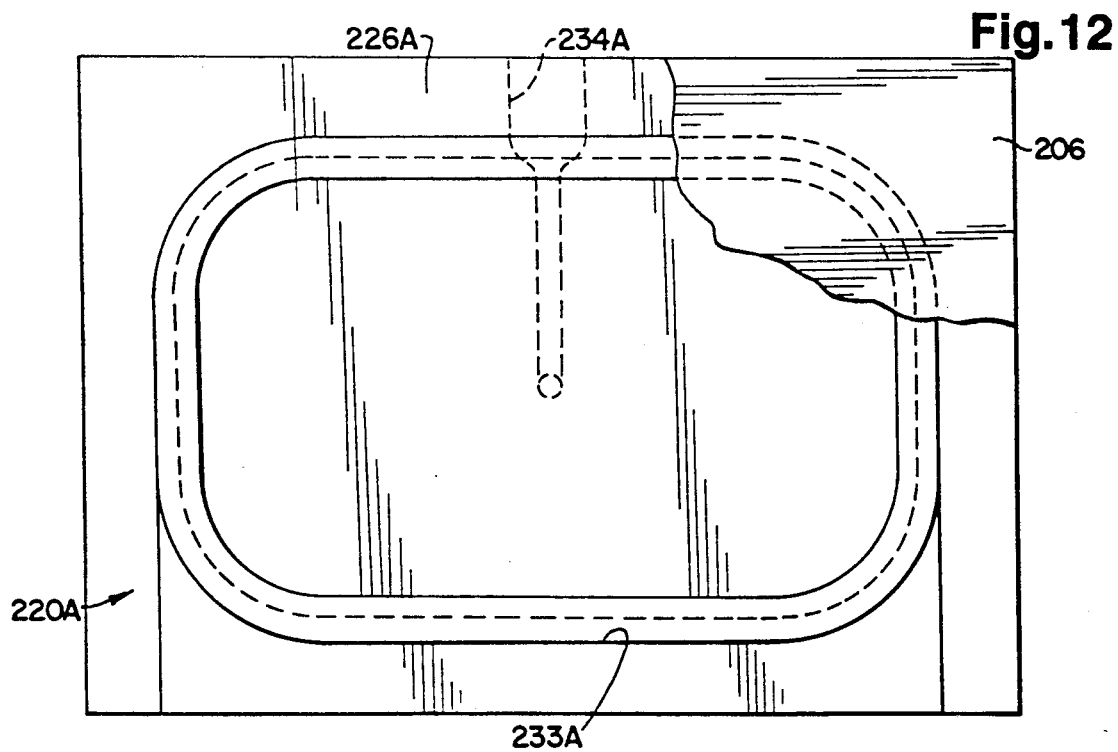
FIG. 12 is a plan view, partially broken away, of a portion of FIG. 11.

Referring now to FIGS. 11 and 12, an alternative calibration fixture 200A, especially adapted for use with a gas, such as nitrogen, as the pressurizing fluid is illustrated. In general the calibration fixture is the same, except as will now be described.

The calibration fixture 200A includes a frame assembly 201, including frame members 202 and 204, and a plate 206 secured to frame member 204. A plate 220A is provided and is secured to frame member 202. Plate 220A defines an upper surface 226A which confronts surface 210. Upper surface 226A also defines an annular groove 233A which is proportioned to receive and house an annular sealing member, such as an O-ring 232A. Annular sealing member 232A is proportioned to sealingly engage against the surface of a contact sensor 100 around the relevant intersections 120, or against, where desired, a bladder interposed between the O-ring 232A and the contact sensor 100. Thus, when a contact sensor 100 is interposed between plates 206, 220A and the pressure chamber 240A which is circumscribed by O-ring 232A is pressurized via fluid introduced through entry passage 234A, a uniform and equal force will be applied to each contact sensor intersection within the chamber 240A.

As was the case with the embodiment of FIGS. 5 to 9, outputs are read from each relevant intersection at plural different pressures, and the readings and values are stored appropriately for later use to provide accurate comparative data for use when the sensor 100 calibrated is used.

From the foregoing it will be apparent to those skilled in the art that other fixtures and methods of using same may be devised without departing from the spirit and scope of the invention. As such it is intended that the invention is not to be construed as being limited thereby.

What is claimed is:

1. A calibration fixture for a contact sensor comprising a first backing sheet having a first plurality of electrodes, a second backing sheet having a second plurality of electrodes confronting said first plurality and being disposed in a crossing pattern to define a plurality of intersections, and resistive material between the electrodes at each intersection to electrically isolate the confronting electrodes at each intersection, said contact sensor providing a variable output representative of the applied force at each intersection as force is applied thereto, and conductors for each of the electrodes terminating in remote contacts from which readings are taken, said fixture comprising
 a first plate against which said contact sensor is supported,
 a second plate confronting said first plate and spaced therefrom,
 an annular sealing member supported on said second plate,
 a bladder disposed between said sealing member and said second plate to define a fluid pressure chamber circumscribed by said sealing member,
 a frame assembly for holding said first and second plates in their confronting relationship, and
 a pressurized fluid entry passage extending through said second plate and communicating with said pressure chamber,
 whereby when a contact sensor is disposed between said bladder and said first plate and the pressure chamber is pressurized, a uniform force is applied to each electrode intersection circumscribed by said annular sealing member.

2. A calibration fixture in accordance with claim 1, wherein said first plate defines a vent means in the surface facing said second plate.

3. A calibration fixture in accordance with claim 1, wherein said annular sealing member is an O-ring.

4. A calibration fixture in accordance with claim 1, and wherein said bladder directly contacts said first plate and all of the electrode intersections in said contact sensor are circumscribed by said annular sealing member.

5. A calibration fixture in accordance with claim 1, and further including means outside the annular sealing member for sensing the outputs for each electrode intersection.

6. A calibration fixture in accordance with claim 5, and including means for storing representations of the outputs for each electrode intersection.

7. A calibration fixture in accordance with claim 1, and wherein said annular sealing member is supported in a surface of said second plate which faces said first plate.

8. A calibration fixture in accordance with claim 1, and wherein said annular sealing member is supported in a side surface of said second plate.

9. A calibration fixture for a contact sensor comprising a first backing sheet having a first plurality of electrodes, a second backing sheet having a second plurality of electrodes confronting said first plurality and being disposed in a crossing pattern to define a plurality of intersections, and resistive material between the electrodes a each intersection to electrically isolate the confronting electrodes at each intersection, said contact sensor providing a variable output representative of the applied force at each intersection as force is applied thereto, and conductors for each of the electrodes terminating in remote contacts from which readings are taken, said fixture comprising a first plate against which said contact sensor is supported, a second plate confronting said first plate and spaced therefrom, an annular sealing member supported on said second plate, a frame assembly for holding said first and second plates in their confronting relationship, and a pressurized fluid entry passage extending through said second plate, whereby when a contact sensor is disposed between said annular sealing member and said first plate and the zone between said second plate and said annular sealing member is pressurized by fluid passing through said fluid entry passage, a uniform force is applied to said contact sensor at each electrode intersection circumscribed by said sealing member.

10. A calibration fixture in accordance with claim 9, wherein said first plate defines a vent means in the surface confronting said sealing member.

11. A calibration fixture in accordance with claim 9, wherein said annular sealing member is an O-ring.

12. A calibration fixture in accordance with claim 9, further including means outside the annular sealing member for sensing outputs from each electrode intersection.

13. A calibration fixture in accordance with claim 12, and including means for storing representations of outputs from each electrode intersection.

14. A method of calibrating a contact sensor in a calibration fixture, said contact sensor comprising a first backing sheet having a first plurality of electrodes, a second backing sheet having a second plurality of electrodes confronting said first plurality in a crossing pattern to define a plurality of intersections, and resistive material between the electrodes at each intersection to electrically isolate the confronting electrodes at each intersection, said contact sensor providing a variable output representative of the applied force at each intersection as force is applied thereto, and conductors for each of the electrodes terminating in remote contacts from which readings are taken, and said fixture comprising a first plate against which a contact sensor is supported, a second plate confronting said first plate and spaced therefrom, an annular sealing member supported on said second plate, a bladder disposed between said sealing member and said second plate to define a fluid pressure chamber circumscribed by said sealing member, a frame assembly for holding said first and second plates in their confronting relationship, and a pressurized fluid entry passage extending through said second plate and communicating with said pressure chamber, the steps comprising positioning a contact sensor between said first plate and said bladder, pressurizing said fluid pressure chamber by introducing pressurized fluid into said fluid pressure chamber to force said bladder into intimate contact with said contact sensor uniformly to apply force against each electrode intersection circumscribed by said sealing member, and sensing outputs from each electrode intersection.

15. The method of claim 14, and wherein the pressurizing and sensing steps are repeated at at least two additional pressures to develop data representing curves for each electrode intersection.

* * * * *